Dec. 6, 1927.  1,651,378
J. B. DE LUCIA ET AL
MACHINE FOR FORMING AND PAPERING PLASTIC MATERIAL
Filed Jan. 12, 1927   3 Sheets-Sheet 2
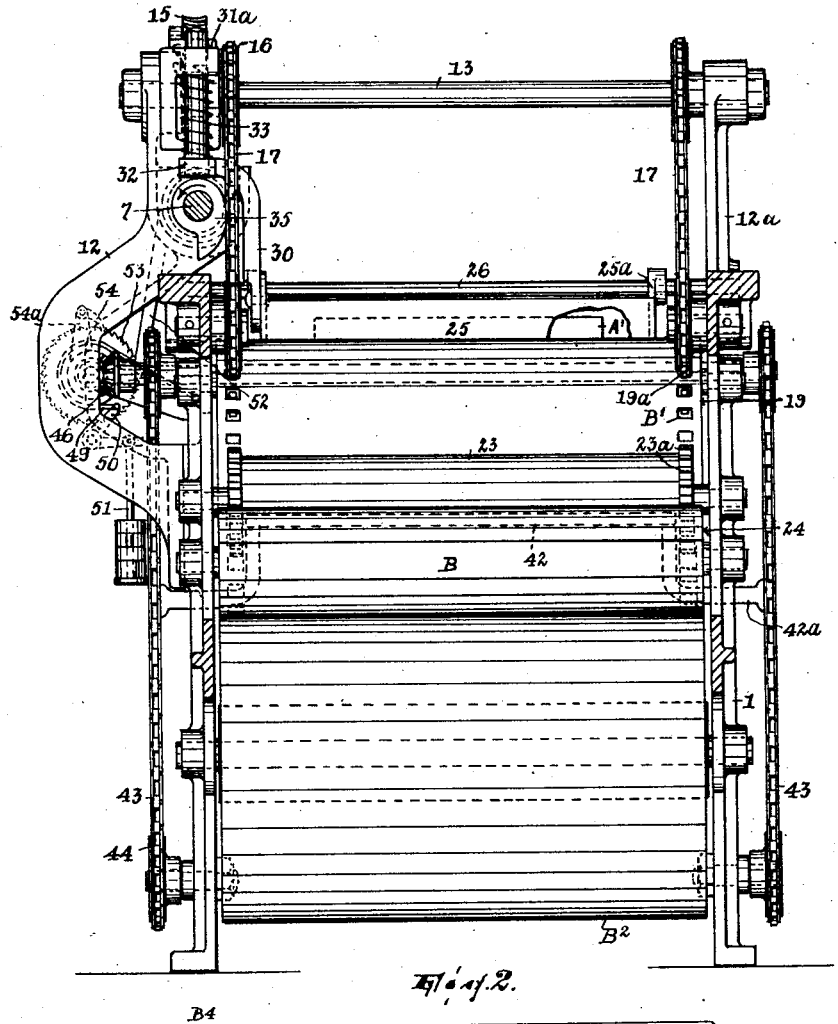

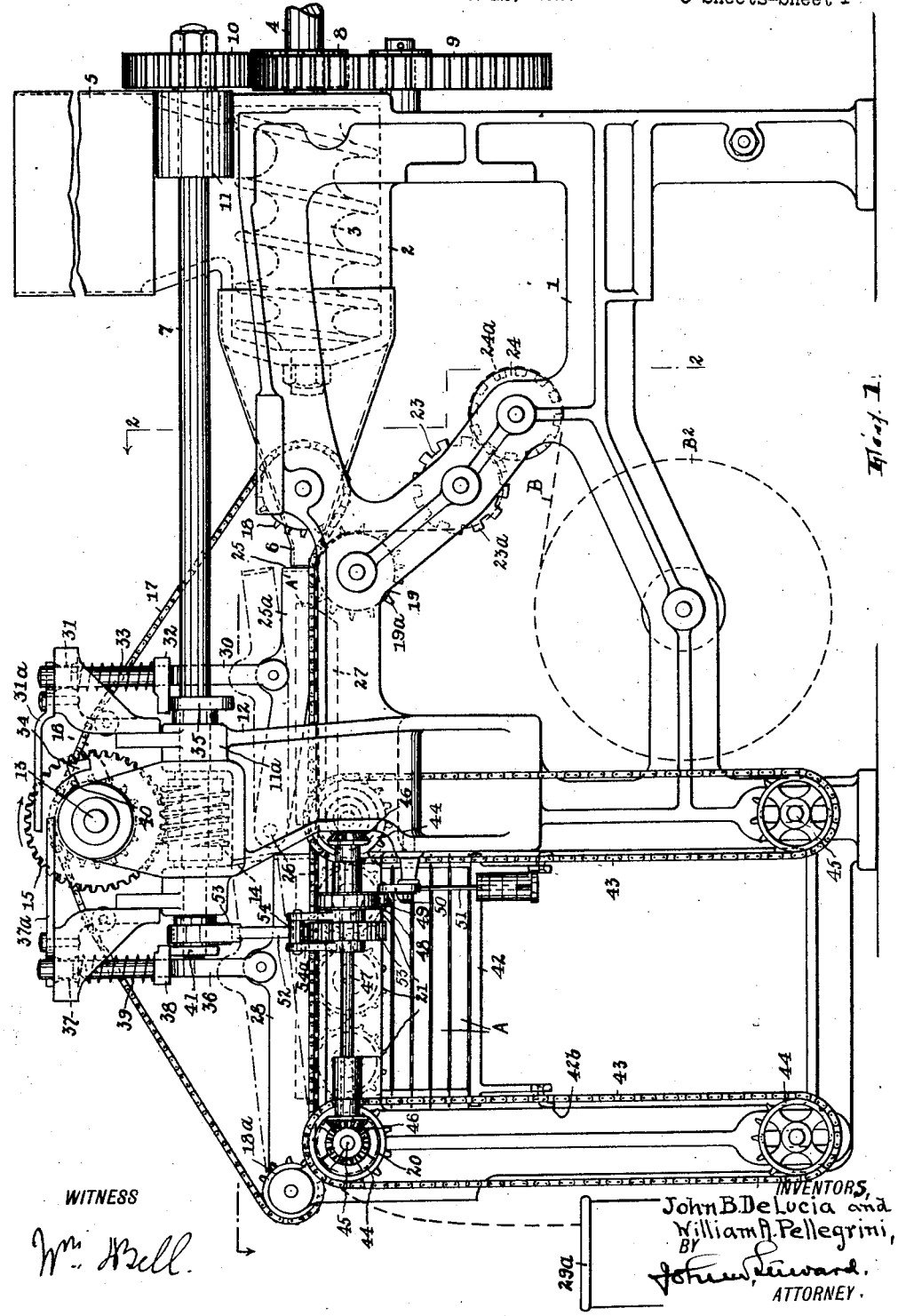

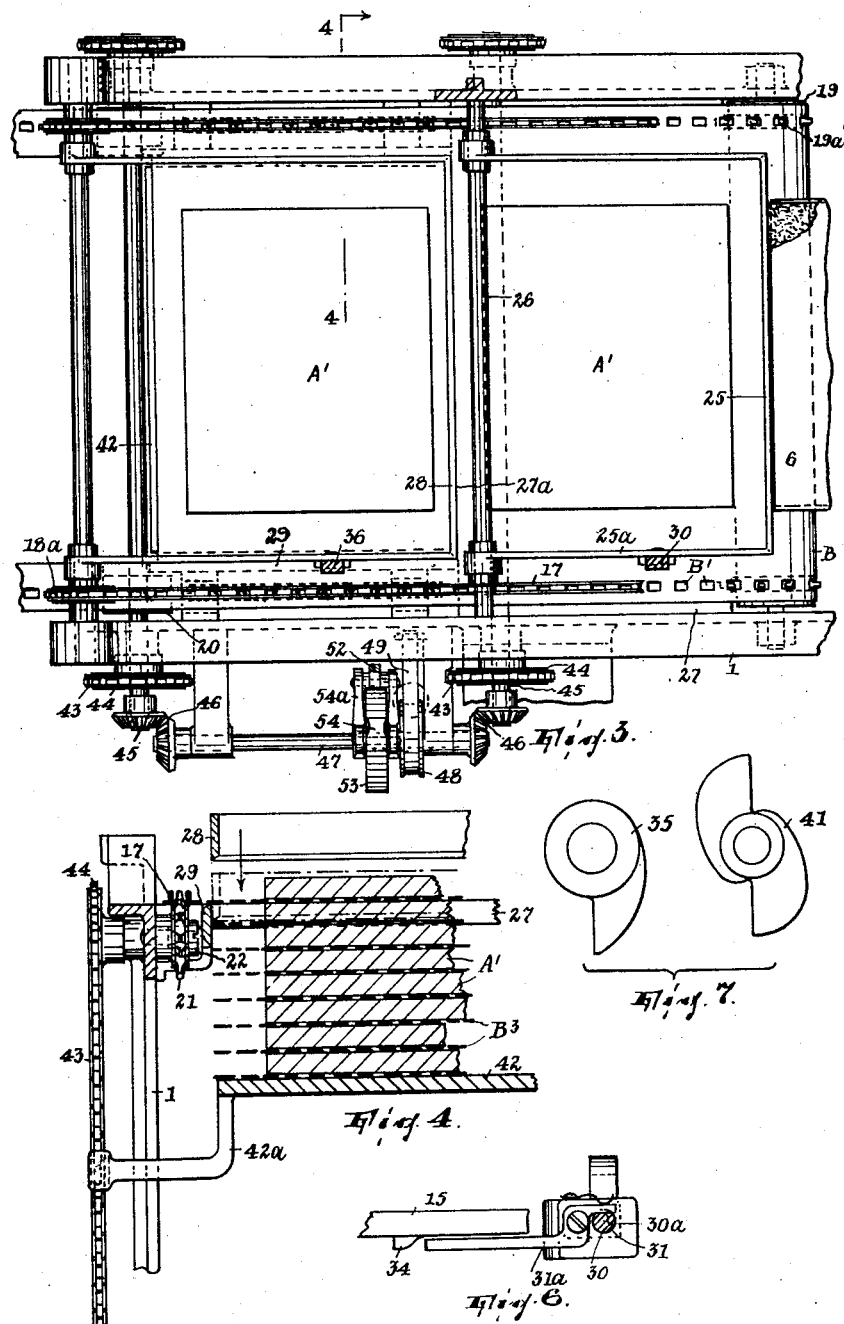

Patented Dec. 6, 1927.

1,651,378

UNITED STATES PATENT OFFICE.

JOHN B. DE LUCIA AND WILLIAM A. PELLEGRINI, OF CLIFTON, NEW JERSEY.

MACHINE FOR FORMING AND PAPERING PLASTIC MATERIAL.

Application filed January 12, 1927. Serial No. 160,572.

Where hamburger steak or other minced meat cakes or patties are prepared and put aside until used they are usually placed on individual pieces of parchment paper and to that extent packaged so that they may be stacked without adhering together. The principal object of this invention is to provide a simple machine by which completed units or packages, each comprising the minced meat and its supporting piece or integument of paper, may be formed, the machine in the preferred form producing the units all in uniform size and all rectangular, that form being desirable especially where the meat is to be used, upon frying, as the interlayer of a hamburger steak sandwich, for example.

In the machine as herein shown the meat is delivered in minced form and as a flat strip from a nozzle and is discharged onto a web or sheet of paper travelling substantially in the direction of the feed of the meat from the nozzle and to which the meat adheres. At intervals means severs the strip of meat to form a cake and spaces it from the next cake which is to be formed. At intervals, to wit, upon the forming of each cake, the part of the paper web or sheet which contains the already formed cake is detached from such web, completing the unit or package comprising such cake and piece; this is done in the machine herein shown, not by severing the paper web clear across, but in such manner as to preserve its margins active in effecting the advance of the web in proper order by pulling action. The advance of the paper web or sheet is effected by suitably rotated sprocket wheels whose teeth enter perforations formed in the web by perforating means contained in the machine. There is also means by which the units as completed are stacked.

In the drawings,

Fig. 1 is a side elevation of the machine;

Fig. 2 a section on line 2—2, Fig. 1;

Fig. 3 a plan, with substantially all parts above the plane of the levers acting to cut the meat strip and the paper sheet or web omitted.

Fig. 4 is a fragmentary section on line 4—4, Fig. 3, illustrating particularly the sheet or web cutting means and the means for stacking the units formed;

Fig. 5 shows in plan the paper sheet or web;

Fig. 6 shows in plan part of the means for controlling the meat-strip cutting lever; and Fig. 7 shows the cams 35 and 41.

1 is a frame in which at one end thereof is arranged a mincing apparatus of wellknown form including a housing 2 and a spiral mincing element 3 in the housing mounted on and adapted to rotate with a horizontal longitudinal shaft 4 journaled in the frame, the housing having a hopper 5 through which the meat or other substance to be minced is fed to the apparatus. The outlet nozzle 6 of the housing has a crosssectional form such as will deliver the minced content in a flat strip the vertical section of which will be apparent from the transverse sectional view of any of the cakes or patties A' formed therefrom and shown in Fig. 4. All the moving parts of the machine are driven from shaft 4, which drives another shaft 7, parallel therewith, through gearing 8, 9 and 10.

Shaft 7 is journaled at one side of the machine in a bearing 11 and also a bearing $11^a$ afforded by one of a pair of uprights 12 $12^a$ of the frame. In suitable bearings in these uprights is journaled a horizontal cross-shaft 13 which is in gear with shaft 7 through an intermeshing worm 14 and worm-wheel 15. This shaft has fixed thereon a pair of sprocket-wheels 16 engaged by endless chains 17 also engaging two other pairs 18 $18^a$ of sprocket-wheels; the chains extending around these several pairs; the arrangement of the three pairs of sprocket-wheels is such that the chains assume in side elevation triangular form with the bases of the triangles approximately horizontal.

A wide roller 19 having a pair of sprocket-wheels $19^a$ is arranged under the outlet 6 of the mincing apparatus, and a pair of narrow rollers 20 (Fig. 3) are arranged below and near the sprocket-wheels $18^a$, the shafts of said rollers being journaled in the frame. In horizontal alinement with the sprocket-wheels $19^a$ is a set of three other pairs of sprocket-wheels 21, the sprocket-wheels of each pair in such set in this case being not mounted on a shaft but on individual stub-shafts 22 (Fig. 4) to afford a clear vertical passage in this part of the machine, as will appear. The chains travel over all the wheels $19^a$ and 21 and so rotate them and the rollers. A horizontal plane tangent to these rollers is coincident with the bottom of the outlet 6, so that delivery of the minced content from the mincing apparatus takes place in such plane onto a paper (or other flexible) sheet or web B which is advanced by and upon said wheels and between the same and the chains, being also supported for its full width by the roller 19 and as to its margins by rollers 20 and having perforations B' along its margins engaged and thus gripped by the teeth of such wheels. The sheet or web B is withdrawn from a roll B² thereof between which and the roller 19 it extends between rollers 23, 24 having at their ends coacting perforating means formed by peripheral perforating teeth 23ª on one and corresponding recesses or dies 24ª on the other. The outlet 6 is narrower (Fig. 3) than the space between the two lines B' of perforations which will be formed by said means in the web B. As will appear, sprocket-wheels 21 are the draft means for the web B; the web is progressively cut away as at B³ (Fig. 5) between the two rows of wheels 21 (one at each side of the machine), leaving its margins B⁴ subject to the draft of such means.

The operation of forming into cakes or patties the strip of minced material A, which is fed from the outlet 6 at approximately the same rate as the paper web B is advanced, is performed by very simple means as follows: 25 is a blade extending across the path of and above the paper web and formed with two carrying arms 25ª which are pivoted to the frame at 26, the whole constituting a lever. This lever normally stands raised, but at intervals (by means to be described) it descends and divides the strip A, allowing the portion A' (or cake) detached by it to travel along with the web B while it checks the feed of the material behind it, in the example actually stopping such feed at the outlet, so that the strip is not mal-formed; the blade is of course not sufficiently sharp to sever the web B. The blade in descending and severing strip A is opposed below by the roller 19. There may be a table 27 (Figs. 1 and 2) to support the paper web, loaded with the strip A fed thereto, between the pair of sprocket-wheels 19 and the set of sprocket-wheels 21.

When the web B has advanced to the stage where its charge or cake A' is flanked by the sprocket-wheels 21 it is supported by the two rows of these wheels, one on each side, being stretched between them and held by their teeth engaging in its perforations. A three-sided rectangular knife is now to descend and cut a rectangle B³ from such strip two sides of which will be inside of and parallel with the perforations, so that such rectangle, with its charge or cake A' thereon, will become a detached and completed unit and may pass down through the passage mentioned as existing between the two rows of wheels 21. This knife, 28, is also a lever, fulcrumed on the shaft of sprocket-wheels 18ª, its two arms as well as its transverse portion having all sharp paper cutting edges; the rear edge 27ª of table 27 and fixed blades 29 (Figs. 3 and 4) may coact, shear-fashion, with the three cutting edges of this knife. The perforated marginal portions or ribbons B⁴ forming the waste of web B resulting from this shearing travel over rollers 20 and may be received in any receptacle 29ª, Fig. 1.

The movement of the blade 25 should be such that it will remain down for a time (so as after cutting off the cake A' to allow the latter to be carried forward by the paper web B and thus suitably spaced from the content of the mincing apparatus which is to continue to be delivered therefrom as a strip) and remain up for a time (or until enough of the strip A has passed to form a cake of the proper size). For this purpose the blade 25 has pivoted to one of its arms 25ª an upstanding stem 30 guided vertically in a hole 31 of an extension of the upright 12 and having a foot-piece 32 thereon between which and said extension a spiral spring 33 is coiled, pressing the stem and hence the blade downwardly. The stem has a lateral notch 30ª in which is engaged a pivoted latch 31ª spring-held against the stem. The gearing by which shaft 13 is driven from the shaft 4 is such that shaft 13 completes a revolution for a predetermined extent of feed of the strip A (or enough to form a cake of the desired size). Sprocket-wheel 15 is made a cam by having a hump 34 thereon, and on each revolution of shaft 13 this hump engages and shifts the latch clear of the stem, so that the blade falls and cuts off and thus forms a cake A. On shaft 7 is a cam 35 engageable with foot-piece 32 to raise the blade. The blade remains down until a predetermined space has been formed between the cake A' it has cut off and the content of the mincing apparatus, whereupon it is quickly raised by cam 35; in the present example this cam is active with greater frequency than cam hump 34 because of the gear ratio of 14—15, wherefore soon after the blade falls it is again raised and relatched, its rise being quick (to avoid undue interference with the following portion of strip A) because of the shape of cam 35 (Fig. 7).

The knife 28 performs a downward and back stroke without pause. For this purpose there are the parts 36, 37, 37ª, 38, 39 and 40 formed and cooperating the same as the parts 30, 31, 31ª, 32, 33 and 34 already described, the cam 41 which is operative on the foot-piece 38 having a shape (Fig. 7) calculated to effect instant return of the knife. Such instant return is necessary in order to prevent interference of the knife with the next-following cake, especially if the spaces between cakes are narrow.

As each unit (comprising a cake A' and its paper rectangle or integument B³) is cut off it is received on a platform which descends in intermittent movements and in proper time so that the units will be deposited one upon another without interference. This platform or support 42 is carried by the adjoining stretches of a forward and a rear pair of endless chains 43, each pair extending around pairs of sprocket-wheels 44 on shafts 45 journaled in the frame. The two upper shafts are, by bevel gearing 46, intergeared with a shaft 37 so that the two pairs of chains move in unison. The descent of the platform under the constantly increasing weight of the stack of units piled thereon may be controlled by a brake device comprising a brake wheel 48 on shaft 47, a brake band 49 fixed at one end to the frame, and a lever 50 connected to the brake band and having a weight carrier 51 to support any number of weights as required. The movement of the chain and sprocket-system to depress the platform may be effected by a link 52 reciprocated by an eccentric 53 on the shaft 7 and oscillating a bell-crank lever 54ª carrying a pawl 54 engaging a ratchet 53 on shaft 47. The platform is removably attached to the chains so that when it approaches the floor it may, on being deprived of its load, be removed and remounted in the highest position. For this purpose its legs 42ª are provided with hooks 42ᵇ to engage the links of the chains.

Having thus fully described our invention what we claim and desire to secure by Letters Patent is:

1. In combination a frame, means to advance a sheet in a given direction and in substantially a horizontal plane, means to feed adhesive material onto the upper face of the sheet while advancing, means to successively detach from the sheet, while advancing, pieces thereof each of which has a portion of said material adhering thereto, and mechanism interconnecting the first- and third-named means for cooperation with each other.

2. In combination a frame, means to guide a sheet in a given direction and in substantially a horizontal plane, movable means to feed adhesive material onto the upper face of the sheet while advancing, means to successively detach from the sheet, while advancing, pieces thereof each of which has a portion of said material adhering thereto, and mechanism interconnecting the second- and third-named means for cooperation with each other.

3. In combination, a frame, means to pull a sheet along in substantially its own plane, said means having a pulling purchase on a relatively limited part of the sheet measured transversely of its path of advance, means to feed adhesive material into adhering contact with one face of the sheet while advancing and relatively lateral of the line of the pull thereon, and means to successively detach from the sheet, while advancing, pieces thereof lateral of said line and having said material adhering thereto.

4. In combination, a frame, means to pull a sheet along in substantially its own plane, said means having a pulling purchase on two parts of the sheet spaced from each other transversely of its path of advance, means to feed adhesive material into adhering contact with one face of the sheet, while advancing, and between the lines of the pull thereon, and means to successively detach from the sheet while advancing pieces thereof between said lines and having said material adhering thereto.

5. In combination, a frame, means to successively form perforations in a sheet, and means to advance a sheet in its own plane and past the first means and in operative relation thereto to be successively perforated thereby, the second-named means having an advancing engagement with the perforations formed in the sheet by the first means.

6. In combination, a frame, rotary wheels having their peripheries presented to each other and coactive to successively form perforations in a sheet advanced between them in its own plane, and means to advance the sheet in substantially its own plane and between the wheels, said means having an advancing engagement successively with the perforations formed therein by said wheels.

7. In combination, a frame, means to advance a sheet in a given substantially horizontal direction and in substantially its own plane, means to feed in substantially said direction and thereby deposit on the advancing sheet adhesive material to be packaged, and means to successively detach from the sheet, while advancing, and thereupon permit to fall from said path pieces of the sheet each of which has a portion of said material thereon.

8. In combination, a frame, means to advance a sheet in a given substantially horizontal direction and in substantially its own plane, means to feed in substantially said direction and thereby deposit on the advancing sheet adhesive material to be packaged, and means to successively detach from the sheet, while advancing, and thereupon remove from said path in a direction from the plane of the sheet pieces of the sheet each of which has a portion of said material thereon.

9. In combination, a frame, means to advance a sheet in substantially its own plane, means to feed a strip of adhesive material into adhering contact with one face of the sheet while advancing, and means to divide the strip while the sheet is advancing into portions arranged in succession lengthwise of the path of advance of the sheet.

10. In combination, a frame, means to advance a sheet in substantially its own plane, means to feed a strip of adhesive material into adhering contact with one face of the sheet while advancing, and means, past which the strip moves with the sheet, to sever the strip transversely and hold against advance with the sheet the relatively following part of the strip while the sheet is in advancing motion.

11. In combination, a frame, means to advance a sheet in substantially its own plane, means to feed a strip of adhesive material into adhering contact with one face of the sheet while advancing, means, past which the strip moves with the sheet, to successively sever the strip transversely and each time hold against advance with the sheet the relatively following part of the strip while the sheet is in advancing motion, whereby to divide the strip into a succession of spaced portions, and means to detach from the sheet successively the pieces thereof respectively containing said portions.

12. In combination, a frame, means to pull a sheet along in substantially its own plane, said means having a pulling purchase on a relatively limited part of the sheet measured transversely of its path of advance, means to feed a strip of adhesive material into adhering contact with one face of the sheet while advancing and relatively lateral of the line of pull thereon, means to divide the strip, while the sheet is advancing, into portions arranged in succession lengthwise of the path of advance of the sheet, and means to detach from the sheet successively the pieces thereof lateral of said line and respectively containing said portions.

13. In combination, a frame, means to pull a sheet along in substantially its own plane, said means having a pulling purchase on two parts of the sheet spaced from each other transversely of its path of advance, means to feed a strip of adhesive material into adhering contact with one face of the sheet, while advancing, and between the lines of pull thereon, means to divide the strip while the sheet is advancing into portions arranged in succession lengthwise of the path of advance of the sheet, and means to detach from the sheet successively the pieces thereof between said lines and respectively containing said portions.

14. In combination, a frame, means to advance a sheet in its own plane and substantially horizontally, a depressible support beneath the sheet being advanced, means to deposit material to be packaged on the sheet while advancing, and means to detach pieces of the sheet therefrom containing each a portion of said material as they successively overlie said support.

15. In combination, a frame, means to advance a sheet in its own plane and substantially horizontally, a support beneath the sheet being advanced, depressible carrying means for the support, means to deposit material to be packaged on the sheet while advancing, means to detach pieces of the sheet therefrom containing each a portion of said material as they successively overlie said support, and means to depress the carrying means on each detachment of a piece of the sheet.

16. In combination, a frame, spaced means to grip the lateral margins of a sheet to be advanced and hold the part of the sheet between them substantially horizontally, means to feed to that face of the sheet which will be upward where it becomes gripped by said means the material to be packaged, and means to successively detach pieces from the leading end of the advancing sheet and containing said material and intervening between its gripped margins.

17. In combination, a frame, means to advance a sheet in substantially its own plane, means to deliver an adhesive strip into adhering contact with one face of the sheet including a nozzle for the plastic material delivering substantially in the direction in which the sheet is advanced, and means, movable through the strip being delivered by the nozzle and close to the outlet of the latter, to check delivery from the nozzle at intervals.

18. In combination, a frame, two rows of wheels arranged side by side and having their axes parallel, means to rotate said wheels including chains engaged respectively with said rows thereof, said wheels and chains being adapted to advance in its own plane a sheet interposed between them, and means to feed material to be packaged onto the sheet while being advanced.

19. In combination, a frame, two rows of wheels arranged side by side and having their axes all parallel, means to rotate said wheels including chains engaged respectively with said rows thereof, said wheels and chains being adapted to advance in its own plane a sheet interposed between them, means to feed material to be packaged onto the sheet while being advanced and means to successively detach from the sheet, while advancing, pieces thereof containing said material and intervening between portions of the sheet interposed between said rows of wheels and the chains.

In testimony whereof we affix our signatures.

J. B. DE LUCIA.
WILLIAM A. PELLEGRINI.